(12) United States Patent
Anand et al.

(10) Patent No.: US 6,748,436 B1
(45) Date of Patent: Jun. 8, 2004

(54) SYSTEM, METHOD AND PROGRAM FOR MANAGEMENT OF USERS, GROUPS, SERVERS AND RESOURCES IN A HETEROGENEOUS NETWORK ENVIRONMENT

(75) Inventors: Vaijayanthimala Anand, Austin, TX (US); Steven Michael French, Austin, TX (US); John Isaac Spencer, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,824

(22) Filed: May 4, 2000

(51) Int. Cl.[7] .............................................. G06F 13/00
(52) U.S. Cl. ....................................... 709/226; 709/223
(58) Field of Search ................................. 709/223, 220, 709/224–225, 226, 229, 246

(56) References Cited

U.S. PATENT DOCUMENTS

| | | | |
|---|---|---|---|
| 5,854,889 A | * 12/1998 | Liese et al. ..................... | 714/43 |
| 5,926,636 A | * 7/1999 | Lam et al. .................... | 709/313 |
| 6,269,405 B1 | * 7/2001 | Dutcher et al. ............. | 709/248 |
| 6,289,380 B1 | * 9/2001 | Battat et al. ................. | 709/224 |
| 6,496,863 B1 | * 12/2002 | Palmer ........................ | 709/224 |

* cited by examiner

Primary Examiner—Ario Etienne
Assistant Examiner—Ramy M. Osman
(74) Attorney, Agent, or Firm—Marilyn Smith Dawkins; Bracewell & Patterson, L.L.P.

(57) ABSTRACT

A system, method, and program for managing users, groups, servers, and resources in a heterogeneous network environment are disclosed. The network environment includes a configuration server coupled to a number of deployment servers, which each operates under a specific platform. In response to receipt of a generic command for management of a user, group, server, or resource by the configuration server, a determination is made based on pre-assignment as to which one of the deployment servers is the appropriate deployment server that is to receive the generic command. The generic command is mapped to a specific-platform command executable under the respective specific platform of the appropriate deployment server. The specific-platform command is executed by the appropriate deployment server to complete a task for performing the generic command. In a preferred embodiment, a set of generic commands for managing the users, groups, servers, and resources in the heterogeneous networked environment is defined. The set of generic commands is correlated to sets of specific-platform commands for different specific platforms. One of the sets of specific-platform commands is determined for a respective specific platform. The specific-platform command is identified within the set of specific-platform commands that is correlated to the generic command being processed by the deployment server.

21 Claims, 5 Drawing Sheets

SYSTEM, METHOD AND PROGRAM FOR MANAGEMENT OF USERS, GROUPS, SERVERS AND RESOURCES IN A HETEROGENEOUS NETWORK ENVIRONMENT

BACKGROUND OF THE INVENTION

1. Technical Field

The present invention relates in general to a network environment, and, in particular, to management of a network environment having various data processing systems, such as server systems and client systems. Still more particularly, the present invention relates to a system, method, and program for managing users, groups, servers and resources in a heterogeneous network environment having various networked systems, such as server systems and client systems, running under different software platforms.

2. Description of the Related Art

A network administrator that administers a homogeneous network (i.e.,.a network that operates under a single operating system platform) must perform the tasks of setting up and managing the users, groups, servers, and resources for the homogeneous network. In managing the users, groups, servers, and resources, the administrator typically uses an administrator system belonging to the homogeneous network to configure and control access, users, groups, servers, and resources within the homogeneous network. The users are only configured and managed with respect to the homogeneous network environment.

Various network environments that operate under different software platforms (i.e., Windows NT, OS/2, UNIX, LINUX, AIX, etc.) exist. If a user, group, server or resource is to be set up and managed for a different network environment operating under another software platform, then another administrator system, other servers, and other clients that all operate under the other platform must be utilized to accomplish the management of the user, group, server or resource for this different network environment. For example, one set of configurations, managerial tasks, and hardware systems must be used for managing a user, group, server or resource for a network environment operating under Windows NT while another set of configurations, managerial tasks, and hardware systems must be used for managing the same user, group, server, and resource for a network environment operating under OS/2. The present trend, however, is to allow users or groups to access heterogeneous networks (i.e., network environment including different software platforms) and to enable users or groups to roam and access a network through any system regardless of the specific platform under which the system is operating (i.e., to manage a user on the network in the same general way regardless of the specific platform of the client system).

The problem is that a user, group, server, or resource must be configured and managed for each and every specific platform within the heterogeneous network environment. Configuration and management of a user, group, server, or resource is preferably the same for each and every different type of specific platform within the heterogeneous network. Thus, any changes made to the configuration and management of a user, group, server, or resource has to be repeated and tracked for each other platform as well. Management of a user, group, server, or resource for a heterogeneous network environment becomes a very tedious and involved task since the user, group, server, or resource has to be separately managed for each network operating under a different platform within the heterogeneous network environment. Therefore, the present invention recognizes that the configuration and management of users, groups, servers, and resources for a heterogeneous network environment needs to be centralized and simplified.

SUMMARY OF THE INVENTION

A system, method, and program for managing users, groups, servers, and resources in a heterogeneous network environment are disclosed. The network environment includes a configuration server coupled to a number of deployment servers, which each operates under a specific platform. In response to receipt of a generic command for management of a user, group, server, or resource by the configuration server, a determination is made based on pre-assignment as to which one of the deployment servers is the appropriate deployment server that is to receive the generic command. The generic command is mapped to a specific-platform command executable under the respective specific platform of the appropriate deployment server. The specific-platform command is executed by the appropriate deployment server to complete a task for performing the generic command. In a preferred embodiment, a set of generic commands for managing the users, groups, servers, and resources in the heterogeneous networked environment is defined. The set of generic commands is correlated to sets of specific-platform commands for different specific platforms. One of the sets of specific-platform commands is determined for a respective specific platform. The specific-platform command is identified within the set of specific-platform commands that is correlated to the generic command being processed by the deployment server.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1A:
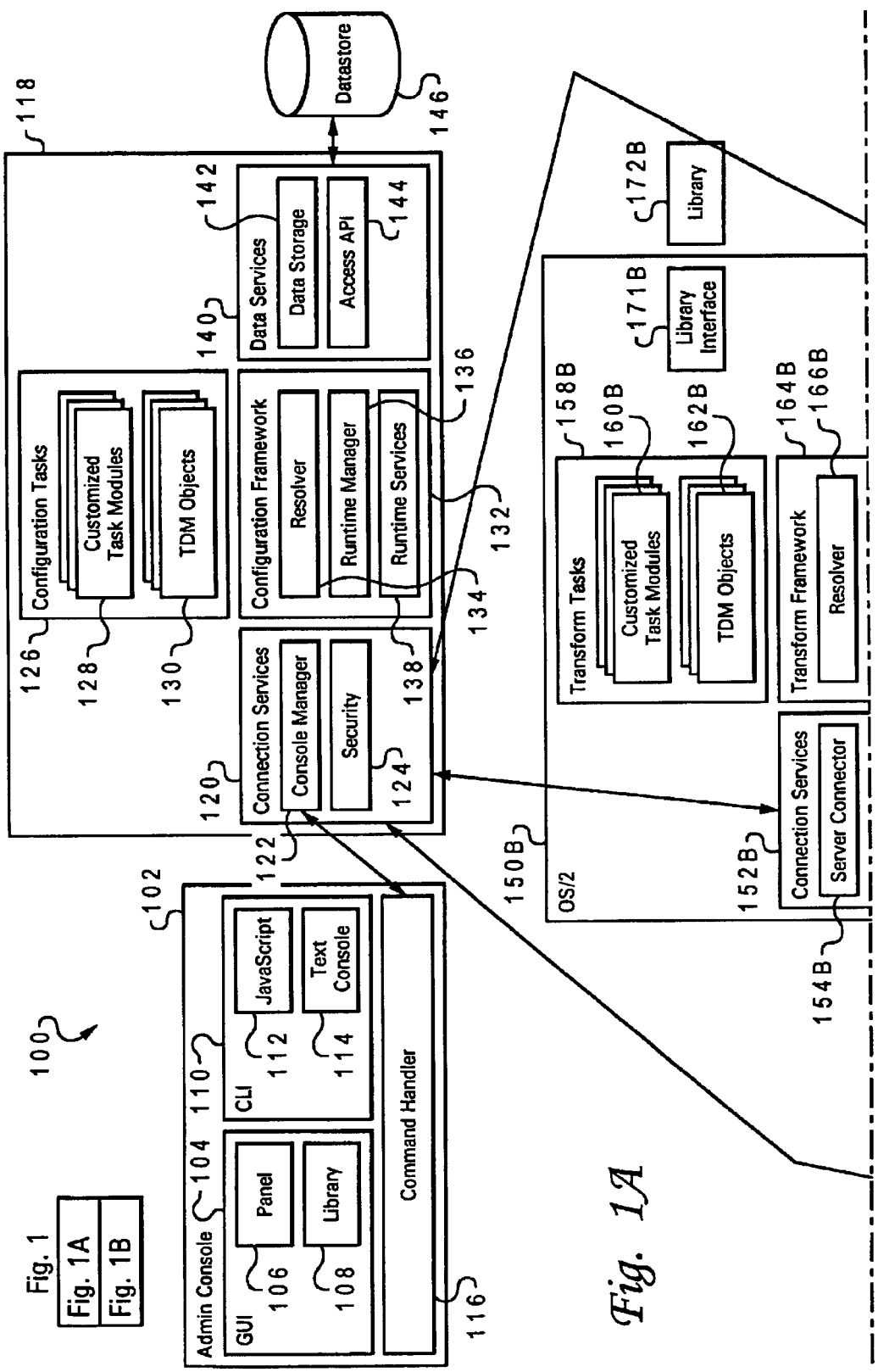
FIG. 1 is an exemplary hardware block diagram of a heterogeneous network environment according to the present invention.
Figure 1B:
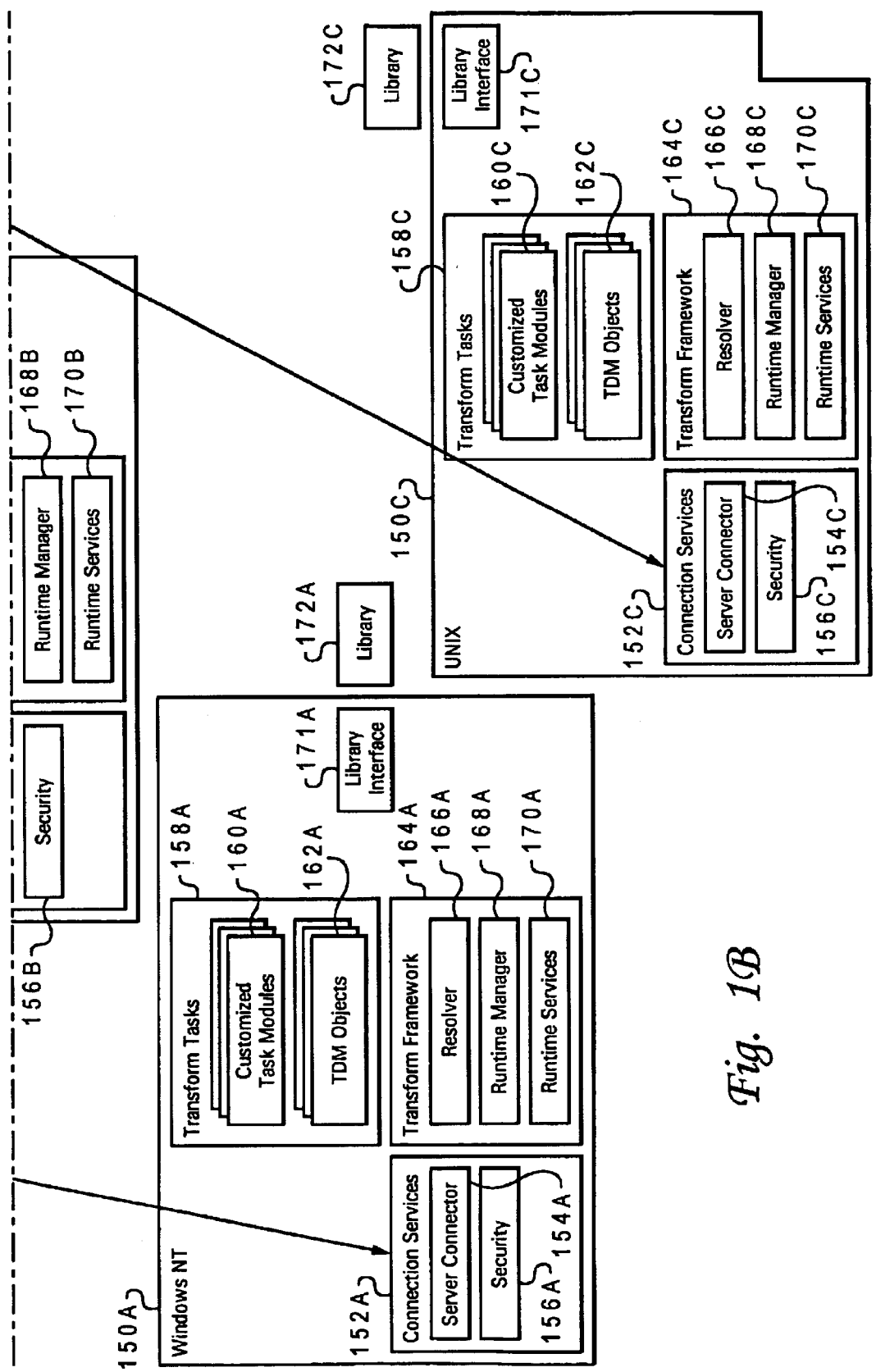

With reference now to FIG. 1, an exemplary hardware block diagram of a network environment 100 is shown. Network environment 100 includes an administrator console 102 coupled in communication with configuration server 118. Deployment servers 150A, 150B, and 150C are coupled in communication with configuration server 118. Network environment 100 is a heterogeneous environment since deployment servers 150A, 150B, and 150C operate under different software platforms (i.e., Windows NT, OS/2, and UNIX, respectively).

A set of generic commands are defined for managing users, groups, servers, and resources in network environment 100. Generic commands for managing users, groups, servers, and resources are entered or selected by a network administrator at administrator console 102 and then sent from administrator console 102 to configuration server 118. The generic command is processed by configuration server 118, and, depending on the generic command, the generic command is directed to a pre-assigned deployment server (i.e., either deployment server 150A, 150B, or 150C). The generic command is converted to a specific-platform command executable by the pre-assigned deployment server. The pre-assigned deployment server then executes the specific-platform command to complete an operation specified by the generic command.

Table 1 shows an exemplary list of generic commands that have been defined for managing users, groups, servers, and resources in network environment 100. The present invention is not in any way limited to these specific generic commands, and any suitable generic command may be defined and used for the present invention.

TABLE 1

| Generic Commands | Management Task Performed |
| --- | --- |
| ACCESSENTRY DEFINE | Defines an access entry for a user or group. |
| ACCESSENTRY DELETE | Deletes an access entry for a user or group. |
| ACCESSENTRY LIST | Lists access entries for a user or group. |
| GROUP DEFINE | Defines a group of users. |
| GROUP DELETE | Deletes a group of users. |
| GROUP QUERY | Queries a group of users. |
| GROUPMEMBER DEFINE | Defines a user as member for a group. |
| GROUPMEMBER DELETE | Deletes a user as member from a group. |
| GROUPMEMBER LIST | Lists members of users in a group. |
| NATIVEGROUP DEFINE | Defines a group of users for a native platform. |
| NATIVEGROUP DELETE | Delete a group of users for a native platform. |
| NATIVEGROUP LIST | Lists a group of users for a native platform. |
| NATIVEGROUP MODIFY | Modifies a group of users for a native platform. |
| NATIVEGROUP QUERY | Queries a group of users for a native platform |
| NATIVESERVER QUERY | Queries a server for a native platform. |
| NATIVEUSER DEFINE | Defines a user for a native platform. |
| NATIVEUSER DELETE | Deletes a user for a native platform. |
| NATIVEUSER LIST | Lists users for a native platform. |
| NATIVEUSER MODIFY | Modifies a user for a native platform. |
| NATIVEUSER QUERY | Queries a user for a native platform. |
| SESSION LIST | Lists a session for a user or group. |
| SERVER DEFINE | Defines a server for heterogeneous network. |
| SERVER DELETE | Deletes a server from heterogeneous network. |
| SERVER MODIFY | Modifies a server in the heterogeneous network. |
| SERVER QUERY | Queries a server in the heterogeneous network. |
| SERVER LIST | Lists a server in the heterogeneous network. |
| USER DEFINE | Defines a user for the heterogeneous network. |
| USER DELETE | Deletes a user from the heterogeneous network. |
| USER MODIFY | Modifies a user in the heterogeneous network. |

TABLE 1-continued

| Generic Commands | Management Task Performed |
| --- | --- |
| USER LIST | Lists the users of the heterogeneous network. |
| USER QUERY | Queries a user in the heterogeneous network. |

Referring to FIG. 1, administrator console 102 is shown with graphical user interface (GUI) module 104, command line interface (CLI) module 110, and command handler 116. Administrator console 102 allows the network or system administrator to communicate and interface with configuration server 118. Administrator console 102 may be operated from GUI module 104 or from a provided CLI module 110 using commands or JavaSript programs. GUI module 104 and CLI module 110 share a common communication interface at command handler 116. The communication interface interacts with console manager 122 on configuration server 118. The administrator may use one of the two interfaces (i.e., GUI or CLI) or use the interfaces (i.e., GUI and CLI) simultaneously. FIG. 1 shows administrator console 102 as a separate console coupled to configuration server 118. However, administrator console 102 may instead be made an integral part of configuration server 118 such that the administrator uses and enters generic commands directly to configuration server 118.

Graphical user interface (GUI) module 104 comprises a set of panels displaying configuration information (i.e., shown as panel block 106) and the underlying libraries (i.e., shown as library block 108) for the configuration information. When the administrator enters a generic command into administrator console 102, information is passed to command handler 116 to communicate with configuration server 118. GUI module 104 provides an interactive graphical representation of the information and tasks relating to the generic commands available to the administrator, and the administrator may be guided through a set of steps to initiate a task. On line help, extended error descriptions, and status monitoring capabilities may be made available to the administrator in the GUI environment.

CLI module 110 contains a text console 114 with which the administrator interacts and a JavaScript interpreter 112 that is used for executing scripts. CLI module 110 passes the generic commands to command handler 116. CLI module 110 provides both a direct command interface for sending the generic commands to configuration server 118 as well as a scripting environment that supports writing scripts in JavaScript containing the generic commands.

Command handler 116 provides communication services for administrator console 102 and handles communication between administrator console 102 and configuration server 118 (i.e., to connection services module 120). Command handler 116 creates the initial connection services with configuration server 118, which includes authenticating the administrator and managing the data flow between administrator console 102 and configuration server 118. Multiple administration consoles 102 may be coupled to and in communication with configuration server 118.

In FIG. 1, configuration server 118 is shown having a communication service module 120, a configuration task module 126, a configuration framework 132, and a data service module 140. Configuration server 118 provides core data storage and processing operations related to managing the network of deployment servers 150A, 150B, and 150C.

The configuration tasks (i.e., related to generic commands) are provided from the management control program, a developer, or other third party person. Configuration server 118 provides the processing function for each administrative configuration task (i.e., related to a generic command) available to the administrator.

Connection service module 120 is responsible for the link from configuration server 118 to administrator console 102. Connection service module 120 comprises console manager 122 and security module 124. Console manager 122 manages connections for configuration server 118. Console manager 122 accepts connections, enforces server connection policies (i.e., connection pooling, allocation of threads, etc.), and forwards commands to runtime manager 136 of configuration framework 132 as they arrive. Security module 124 implements the authentication policy for a new connection utilizing a security infrastructure and security extensions to determine whether the request should be accepted or rejected.

Configuration task module 118 contains two cooperative modules: a customized task module 128 and a managing object module 130. Customized task module 128 comprises a collection of classes that implement a managing task related to the generic command and contain the execution logic for each task. Managing object module 130 contains the set of core classes representing managed entities with which configuration task module 118 interacts.

Configuration framework module 132 provides the core infrastructure services and comprises a resolver 134, runtime manager 136, and runtime service module 138. Resolver 134 parses the generic commands received from administrator console 102, determines the configuration task from configuration task module 12.6 that is to be executed, and passes back the information to runtime manager 136. Runtime manager 136 is the execution core for configuration server 118. Runtime manager 136 schedules configuration tasks, manages the task queue, and provides the management interface for configuration server 118. Runtime services module 138 provides a set of helper services to configuration task module 126, such as initiating transforms, providing access to server facilities, and logging "message-generating events".

Data service module 140 is the interface between configuration framework module 132 and data-store 146.

Data service module 140 provides an access application programming interface (API) that abstracts the physical data from data-store 146, including translation of data types between configuration server 118 and data-store 146.

Deployment servers 150A, 150B, and 150C each hosts a set of transformation tasks for a specific platform.

Deployment server 150A operates under Windows NT while deployment server 150B operates under OS/2 and deployment server 150C operates under UNIX. Similar to configuration tasks, transform tasks may be provided from the management control program, a developer, or other third party person. Deployment servers 150A, 150B, and 150C respectively comprise connection service modules 152A, 152B, and 152C, transform task modules 158A, 158B, and 158C, and transform framework modules 164A, 164B, and 164C. Connection service modules 152A, 152B, and 152C are responsible for the link from configuration server 118 to respective deployment servers 150A, 150B, and 150C. Connection service modules 152A, 152B, and 152C manage the connection between the servers including the data exchange, as shown in respective server connector modules 154A, 154B, and 154C, and the security, as shown in respective security modules 156A, 156B, and 156C. Security modules 156A, 156B, and 156C each implements the authentication policy for a new connection.

Transform task module 158A, 158B, or 158C follows the same basic design as configuration task module 126. Transform task modules 158A, 158B, and 158C each contains two respective cooperative modules: a respective customized task module 160A, 160B, or 160C and a respective managing object 162A, 162B, or 162C. Customized task module 160A, 160B, or ,160C contains a collection of classes that implement managing tasks and the logic for transform tasks. Managing object module 162A, 162B, or 162C contains the set of core classes with which transform task objects interact.

Transform framework modules 164A, 164B, and 164C are each a mirror to the configuration framework module 132 that provides the core infrastructure services, and each include respective resolver 166A, 166B, and 166C, runtime manager 168A, 168B, and 168C, and runtime service module 170A, 170B, and 170C. Resolver 166A, 166B, or 166C parses the generic command received from configuration server 118, determines the transform task to execute, and passes back this information to respective runtime manager 166A, 166B, or 166C. Runtime manager 166A, 166B, or 166C is the execution core for respective deployment server 150A, 150B, or 150C. Runtime manager 166A, 166B, or 166C schedules transform tasks, manages the task queue, and provides the system management interface for respective deployment server 150A, 150B, or 150C. Runtime service module 170A, 170B, or 170C provides a set of helper services to transform tasks, such as chaining transforms and recording events. Furthermore, deployment servers 150A, 150B, and 150C are respectively coupled to libraries 172A, 172B, and 172C (such as dynamic link libraries (DLLs)) through library interfaces 171A, 171B, and 171C. Library 172A, 172B, or 172C maps and correlates the generic command or deployment server command to a specific-platform command.

Figure 2:
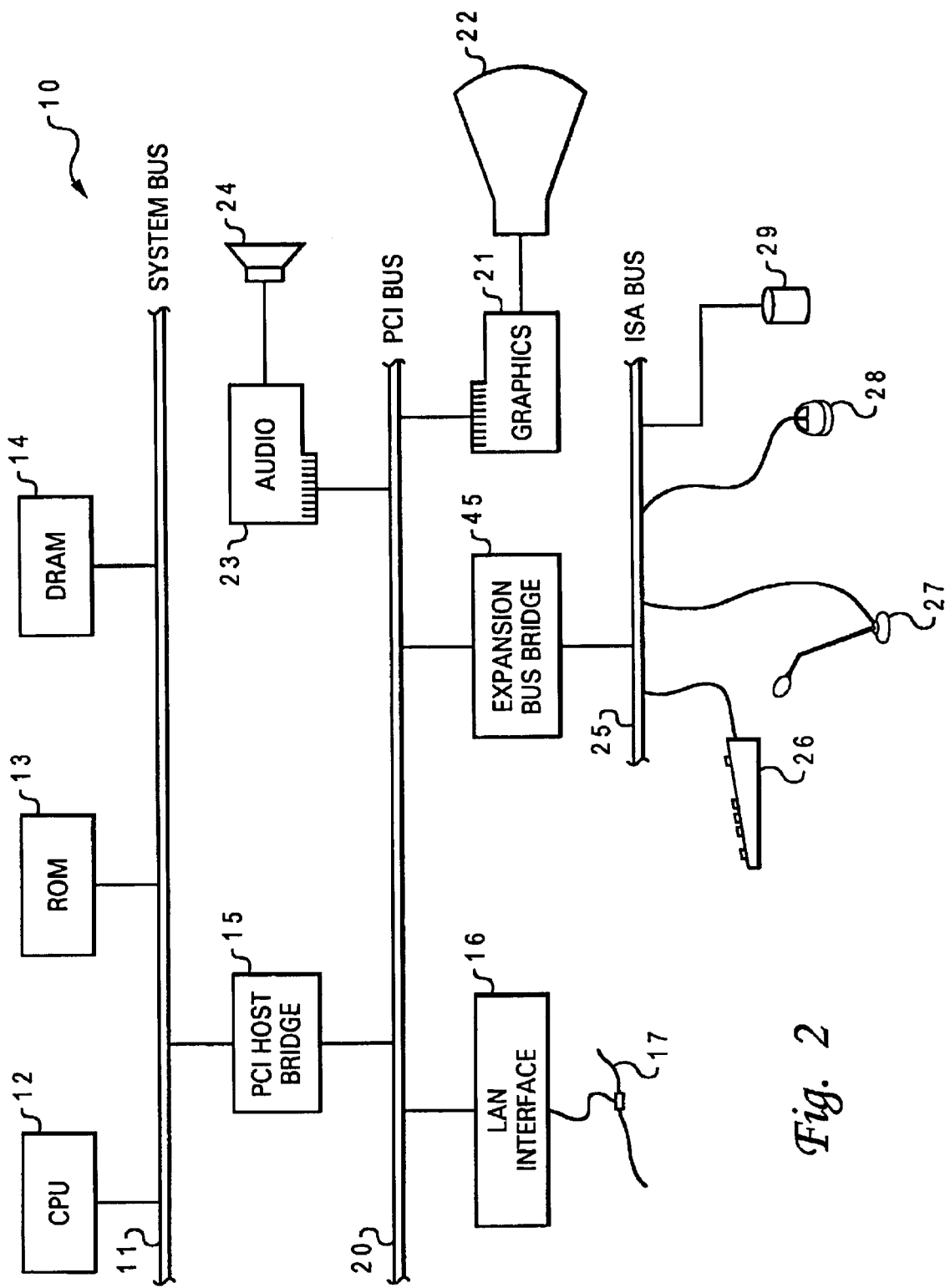
FIG. 2 is a block diagram of an exemplary embodiment of a data processing system, which may be the configuration server, one of the deployment servers, or the administrator console shown in FIG. 1.

FIG. 2 shows an exemplary block diagram of a data processing system 10, which may be configuration server 118, deployment server 150A, 150B, or 150C, or administrator console 102 used for the present invention. As shown, a central processing unit (CPU) 12, read only memory (ROM) 13, and a Dynamic Random Access Memory (DRAM) 14 are connected to a system bus 11 of server system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path allowing PCI devices to directly access DRAM 14.

In addition, an audio adapter 23 may be attached to PCI local bus 20 for controlling audio output through speaker 24. A graphics adapter 21 may be attached to PCI local bus 20 for controlling visual output through display monitor 22. Also attached to PCI local bus 20 is a local-area-network (LAN) interface adapter 16. LAN interface adapter 16 is for connecting computer system 10 to a local-area network (LAN) 17. A PCI-to-ISA bus bridge, such as an expansion bus bridge 45, may be utilized for coupling an ISA bus 25 to PCI local bus 20. Although the illustrated exemplary embodiment describes a PCI local bus 20 and an ISA bus 25, the present invention is not limited to these particular bus architectures., Rather, the present invention can be utilized in any bus system having other different bus architectures.

As shown, a keyboard 26, a microphone 27, a mouse 28, and a hard disk drive 29 may be attached to ISA bus 25 for performing certain basic I/O functions.

Figure 3:
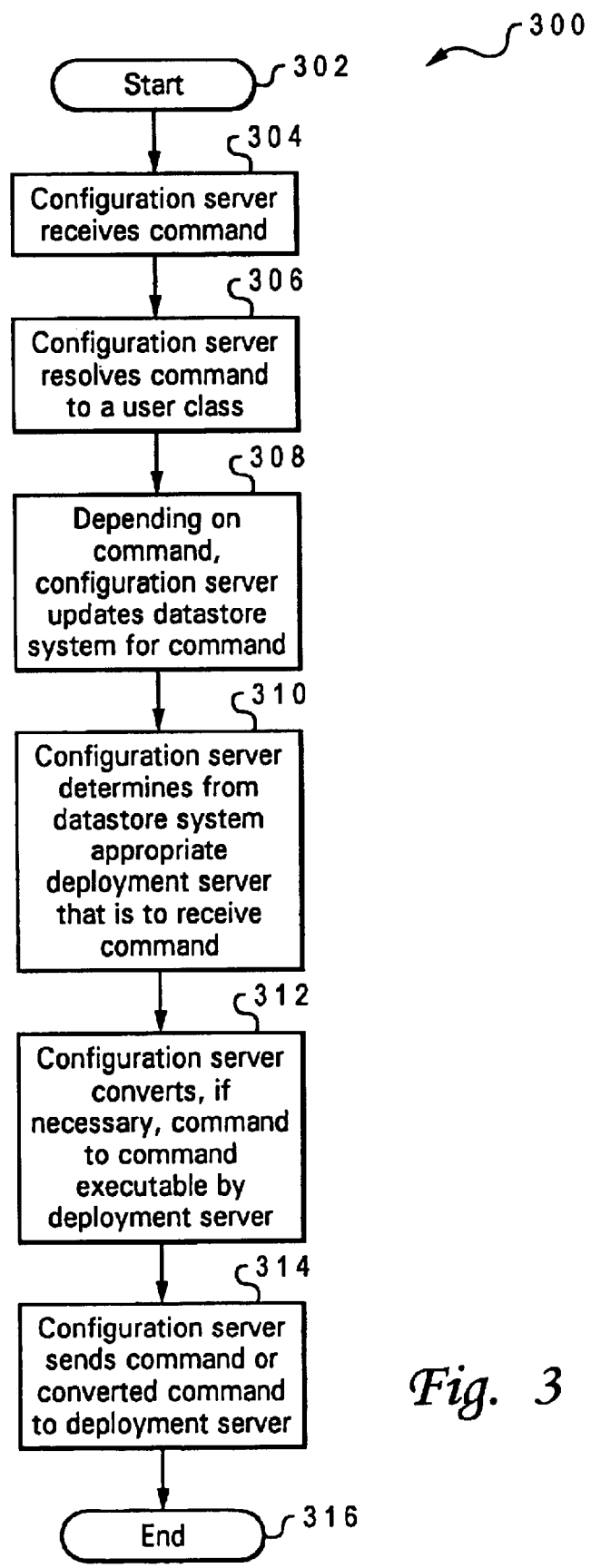
FIG. 3 is a flow chart of an exemplary method executed by the configuration server for implementing the present invention.

Referring to FIG. 3, a flow chart of an exemplary method 300 executed by configuration server 118 for implementing the present invention is shown. Method 300 starts at block 302. The administrator is authenticated to configuration server 118 through administrator console 102. Administrator console 102 accepts the administrator identification and password from the administrator. The administrator securely communicates with configuration server 118, and the generic command is sent from administrator console 102 to configuration server 118. Method 300 proceeds to block 304, which shows configuration server 118 receiving the generic command.

Administrator console 102 communicates with runtime manager 136 of configuration server 118 using a defined command specification. A command conforming to this specification is generated by console application (i.e., GUI or CLI) and sent to console manager 122. Console manager 122 forwards the command to runtime manager 136. The command is processed by runtime manager 136 by validating syntax and returning a notification to console manager 122 of acceptance or rejection of the command. Console manager 122 forwards the notification to console application (i.e., GUI or CLI) at administrator console 102. Runtime manager 136 provides a queue service to allow multiple administrator sessions to submit commands to a single configuration server 118 while allowing commands to be processed synchronously. At times, commands are dispatched asynchronously, such as system monitoring commands. Runtime manager 136 receives the type of execution model appropriate for the generic command in task definition table (i.e., Table 1). If the task is a normal task, then the task is added to the queue. The scheduler function within runtime manager 136 handles dispatching tasks from the queue utilizing a first-in first-out (FIFO) queue strategy.

Method 300 next proceeds to block 306, which shows configuration server 118 resolving the generic command to a class for a user, group, server, or resource. Runtime manager 136 uses resolver 134 to transform the generic command into a class or object based on the definition of the task related to the generic command. If the generic command passed to resolver 134 is valid, then runtime manager 136 uses the resulting task definition class or object to manage the execution of the task. If the generic command is not valid, then runtime manager 136 generates an error result and returns the error result back to administrator console 102. Runtime manager 136 determines the runtime context in which the task executes.

Resolver 134 uses a command resolution table (not shown) to select a task. Each row of the table contains one action, one object, zero or more parameters, and the class name of a task. All parameters contain the parameter text, a flag indicating whether the parameter is required or optional, type of parameter, and, optionally, a validator method that determines whether the parameter is valid or not. Three types of parameters exist: a distinguishing parameter, a normal parameter, and a settings parameter. A distinguishing parameter is always a required parameter and also requires that a value for the parameter be supplied. This parameter is used in the selection processor of the task. A command containing this parameter has the value passed in the command compared to the value in the command resolution table. If the values match, then the next criteria is followed. Otherwise, this task entry is not selected. A normal parameter is either required or optional and is not used in the selection criteria for the task. A settings parameter is a side parameter used by the task to apply settings to the object addressed by the task. The settings parameter allows settings to be added to an object within a create or add task in one step instead of requiring a set of tasks to follow the first task. Settings parameters are always optional and are not used in the selection criteria for the task. Resolver 134 determines which task or object is to be executed. Three criteria are used in the selection process: the action, the object, and the distinguishing parameters. A command that contains one or more settings parameters is expected to apply multiple configuration steps before initializing subsequent processing. The action handling task or object is responsible for determining the correct order of execution to ensure that the correct results are generated by a command that uses this feature.

In FIG. 3, method 300 proceeds to block 308. Block 308 shows that, depending on the generic command, configuration server 118 updates data-store 146 in accordance with the generic command. Method 300 then moves to block 310, which depicts configuration server 118 searching in data-store 146 for an appropriate deployment server 150A, 150B, or 150C that has been pre-assigned to receive the generic command. Data-store 146 stores the data that pre-assigns appropriate deployment servers to which respective generic commands are to be sent. Configuration server 118 searches this data for the appropriate deployment server.

Method 300 then moves to block 312, which shows that configuration server 118 converts, if necessary, the generic command to a deployment server command that is executable by the appropriate deployment server. The deployment server command is maintained as a platform-neutral command within the appropriate deployment server until the deployment server accesses library 172A, 172B, or 172C of commands that maps the generic command or deployment server command to a specific-platform command. Library interface 171A, 171B, or 171C is used to map from the generic format or deployment server format to the specific platform format. For example, the deployment server command may be a generic command that is executed in JAVA by the appropriate deployment server. When the dynamic link library (DLL) 172A, 172B, or 172C is accessed to convert the generic command or deployment server command to a specific platform command., the generic command is then mapped and converted to a specific platform command. The appropriate deployment server uses a JAVA Native Interface (JNI) 171A, 171B, or 171C to access the library for mapping the generic command or deployment server command to a specific platform command that is executable by the appropriate deployment server operating under the specific platform.

Following block, 312, method 300 proceeds to block 314, which shows that configuration server 118 sends the deployment server command or the generic command to the appropriate deployment server. Method 300 thereafter ends at block 316.

Figure 4:
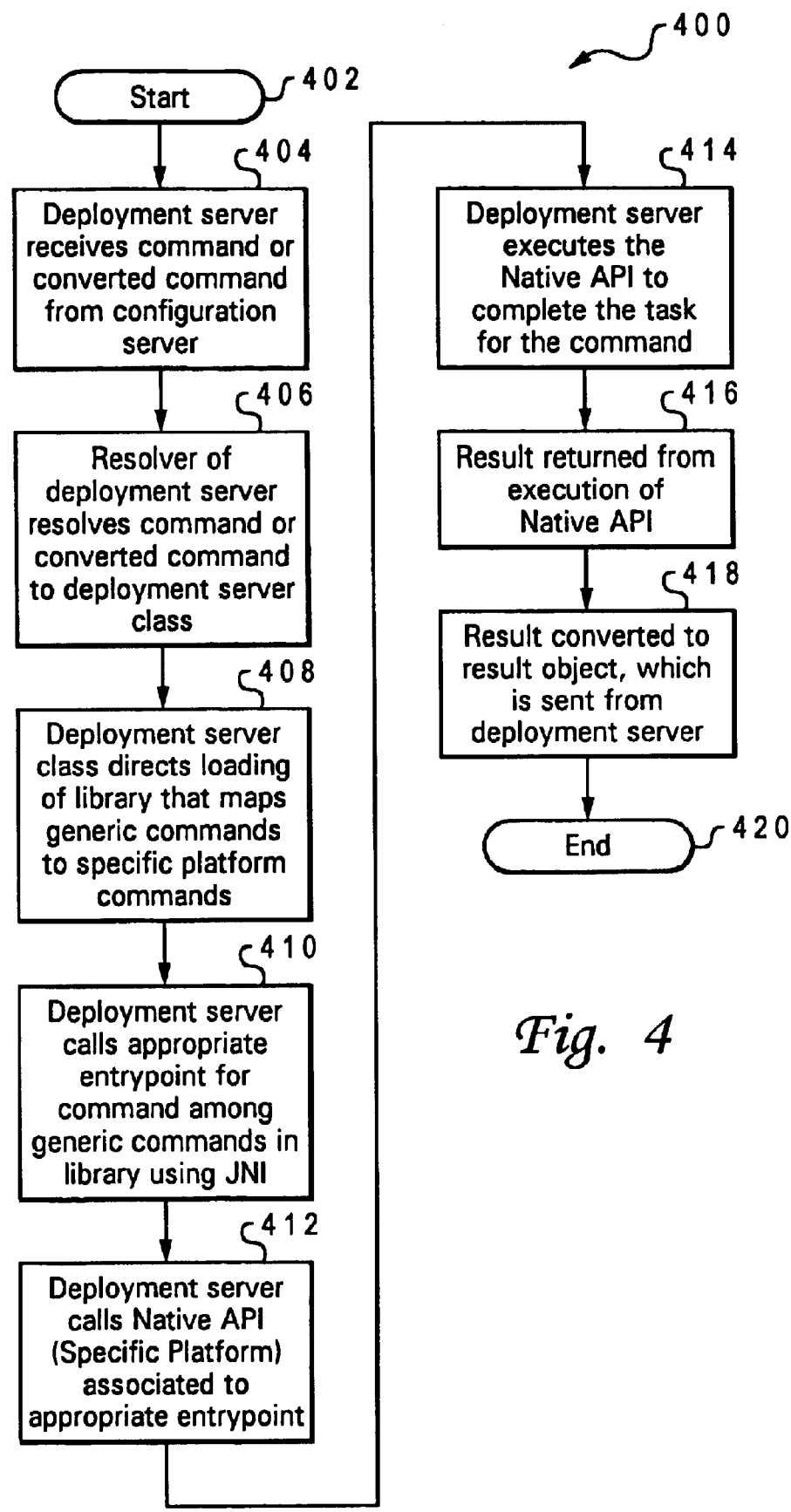
FIG. 4 is a flow chart of an exemplary method executed by a deployment server for implementing the present invention.

With reference now to FIG. 4, a flow chart of an exemplary method 400 executed by deployment server 150A, 150B, or 150C for implementing the present invention is shown. The commands processed within deployment server 150A, 150B, or 150C are platform-neutral until library 172A, 172B, or 172C is called and accessed. The commands are then mapped and converted to a specific platform format. For example, the commands processed within deployment server 150A, 150B, or 150C may be executable in JAVA. The commands are then respectively converted to a Windows NT Application Programming Interface (API), an OS/2 API, and an UNIX API for respective deployment servers 150A, 150B, and 150C after libraries 172A, 172B, and 172C are called and accessed through library interfaces 171A, 171B, and 171C.

Method 400 starts at block 402 and then proceeds to block 404, which shows that deployment server 150A, 150B, or 150C receives the generic command or the converted deployment server command from configuration server 118. Method 400 next moves to block 406, which shows that resolver 166A, 166B, or 166C resolves the generic command or deployment server command to a deployment server class. Next, at block 408, the deployment server class directing library 172A, 172B, or 172C maps the generic commands or the deployment server commands to specific platform commands to be loaded by respective deployment server 150A, 150B, or 150C. Method 400 continues to block 410, which shows deployment server 150A, 150B, or 150C calling an appropriate entrypoint for the generic command or deployment server command among the various generic commands/deployment server commands in library 172A, 172B, or 172C through using a library interface 171A, 171B, or 171C (i.e., JAVA Native Interface (JNI) if the generic command or deployment server command is executable in JAVA and the specific platform command is in a specific-platform format). Method 400 then proceeds to block 412, which shows deployment server 150A, 150B, or 150C calling an appropriate native application programming interface (API) associated with the appropriate entrypoint. Following block 412, method 400 moves to block 414, which represents deployment server 150A, 150B, or 150C executing the native API call to complete the task for the command.

Table 2, below, shows exemplary generic commands mapped to respective native APIs for Windows NT and OS/2. The native APIs for Windows NT are called for completing the tasks for the commands by deployment server 150A operating under Windows NT, and the native APIs for OS/2 are called for completing the tasks for the commands by deployment server 150B operating under. OS/2.

TABLE 2

| Generic commands | Windows NT | OS/2 |
|---|---|---|
| NATIVEGROUP DEFINE | NetLocalGroupAdd | Net32LocalGroupAdd |
| NATIVEGROUP DELETE | NetLocalGroupDelete | Net32LocalGroupDelete |
| NATIVEGROUP QUERY | NetLocalGroupGetInfo | Net32LocalGroupGetInfo |
| NATIVEUSER DEFINE | NetUserAdd | Net32UserAdd |
| NATIVEUSER DELETE | NetUserDelete | Net32UserDelete |
| NATIVEUSER MODIFY | NetUserSetInfo | Net32UserSetInfo |
| NATIVEUSER QUERY | NetUserGetInfo | Net32UserGetInfo |

Returning to FIG. 4, method 400 then proceeds to 416, which shows a result returned from execution of the native API call. Method 400 moves to block 418, which depicts the result being converted to a result object, which is sent from deployment server 150A, 150B, or 150C to configuration server 118. The result object is then sent from configuration server 118 to administrator console 102. Method 400 finally ends at block 420.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for managing users, groups, servers, and resources in a heterogeneous network environment, said method comprising:

in response to receiving, from an administration client, a generic command at a configuration server within a heterogeneous network environment including a plurality of deployment servers each operating under a different platform, the configuration server parsing said generic command and selecting a task to manage performance of said generic command based upon said generic command by reference to a command resolution data structure;

said configuration server selecting, based upon said generic command, a deployment server among the plurality of deployment servers to perform one or more operations implicated by the generic command; and the configuration server generating a platform-independent deployment server command corresponding to the generic command and sending the deployment server command to the selected deployment server for processing so that the selected deployment server at least partially performs a management operation requested by the generic command.

2. The method according to claim 1, wherein selecting a task further comprises:

the configuration server resolving the generic command to a class by reference to a command resolution table, said resolving including selecting the class based upon an action, an object and at least one distinguishing parameter all specified in the generic command and in a matching entry of the command resolution table.

3. The method according to claim 1, further comprising:

the configuration server updating the data-store in accordance with the generic command.

4. The method of claim 1, and further comprising:

the deployment server converting the platform-independent deployment server command to a platform-specific command executable under a platform of the selected deployment server; and the selected deployment server executing the platform-specific command under the platform to complete a management operation requested by the generic command.

5. The method according to claim 4, said converting further comprising:

the selected deployment server resolving the deployment server command to a deployment server class; and directing, by the deployment server class, a library that maps deployment server commands to platform-specific commands under the platform of the selected deployment server to be loaded for execution by the selected deployment server.

6. The method according to claim 5, wherein executing the platform-specific command further comprises:
the selected deployment server calling an appropriate entrypoint for the deployment server command in the library;
the selected deployment server calling a native application programming interface associated with the appropriate entrypoint; and
executing the native application programming interface to complete the management operation.

7. The method according to claim 4, further comprising:
after the management operation is completed, the selected deployment server returning a result to the configuration server.

8. A system for managing users, groups, servers, and resources, said system comprising:
a configuration server within a heterogeneous network environment including a plurality of deployment servers each operating under a different platform, wherein the configuration server, responsive to receiving from an administration client a generic command, parses said generic command and selects a task to manage performance of said generic command based upon said generic command by reference to a command resolution data structure;
wherein said configuration server selects, based upon said generic command, a deployment server among the plurality of deployment servers to perform one or more operations implicated by the generic command; and
wherein the configuration server generates a platform-independent deployment server command corresponding to the generic command and sends the deployment server command to the selected deployment server for processing so that the selected deployment server at least partially performs a management operation requested by the generic command.

9. The system according to claim 8, wherein the configuration server selects the task by resolving the generic command to a class by reference to a command resolution table based upon an action, an object and at least one distinguishing parameter all specified in the generic command and in a matching entry of the command resolution table.

10. The system according to claim 8, and further comprising a data-store that said configuration server updates in accordance with the generic command.

11. The system according to claim 8, and further comprising the selected deployment server, wherein the selected deployment server converts the platform-independent command to a platform-specific command executable under a platform of the selected deployment server and thereafter executes the platform-specific command under the platform to complete a management operation requested by the generic command.

12. The system according to claim 11, wherein said deployment server converts the platform-independent deployment server command to the platform-specific command by resolving the deployment server command to a deployment server class and by directing a library that maps deployment server commands to platform-specific commands under the platform of the selected deployment server to be loaded for execution by the selected deployment server.

13. The system according to claim 12, wherein said deployment server executes the platform-specific command by calling an appropriate entrypoint for the deployment server command in the library, calling a native application programming interface associated with the appropriate entrypoint, and executing the native application programming interface to complete the management operation.

14. The system according to claim 11, wherein said selected deployment server returns an execution result to the configuration server.

15. A program product for managing users, groups, servers, and resources within a heterogeneous network environment including a plurality of deployment servers each operating under a different platform and a configuration server coupled to the plurality of deployment servers, said program product comprising:
a computer usable medium in which program code is encoded, said program code including:
means, responsive to receiving from an administration client a generic command at the configuration server, for parsing said generic command and for selecting a task to manage performance of said generic command based upon said generic command by reference to a command resolution data structure;
means for selecting, based upon said generic command, a deployment server among the plurality of deployment servers to perform one or more operations implicated by the generic command; and
means for generating a platform-independent deployment server command corresponding to the generic command and for sending the deployment server command to the selected deployment server for processing so that the selected deployment server at least partially performs a management operation requested by the generic command.

16. The program product according to claim 15, said means for selecting the task further comprising:
means for resolving the generic command to a class by reference to a command resolution table based upon an action, an object and at least one distinguishing parameter all specified in the generic command and in a matching entry of the command resolution table.

17. The program product according to claim 15, and further comprising means for causing the configuration server to update a data-store in accordance with the generic command.

18. The program product according to claim 15, and further comprising:
means for causing the deployment server to convert the platform-independent command to a platform-specific command executable under a platform of the selected deployment server; and
means for causing the deployment server to thereafter execute the platform-specific command under the platform to complete a management operation requested by the generic command.

19. The program product according to claim 18, and further comprising:
means for causing said deployment server to convert the platform-independent deployment server command to the platform-specific command by resolving the deployment server command to a deployment server class and by directing a library that maps deployment server commands to platform-specific commands under the platform of the selected deployment server to be loaded for execution by the selected deployment server.

20. The program product according to claim 19, and further comprising:

means for causing the deployment server to execute the platform-specific command by calling an appropriate entrypoint for the deployment server command in the library, by calling a native application programming interface associated with the appropriate entrypoint, and by executing the native application programming interface to complete the management operation.

21. The program product according to claim 18, and further comprising:

means for causing the selected deployment server to return an execution result to the configuration server.

* * * * *